Patented Dec. 11, 1951

2,578,479

UNITED STATES PATENT OFFICE 2,578,479

PROCESS FOR POLYMERIZING BIS-DIPHENYLENE ETHYLENE

Raymond John Stuart Jennings and Alan Fowler Williams, London, England, assignors to C. D. Patents Limited, London, England, a British company No Drawing. Application August 1, 1949, Serial No. 108,058. In Great Britain August 4, 1948

2 Claims. (Cl. 260—93.5)

This invention relates to the preparation from fluorene (diphenylenemethane) of bis-diphenylene ethylene and of thermoplastic resins made therefrom.

One object lies in producing from fluorene

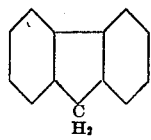

as a first step the compound bis-diphenylene ethylene

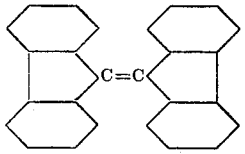

containing the reactive and polymerisable ethylene linkage >C=C<.

Another object lies in producing complex hydrocarbon resins of low molecular weight and high softening point from the monomeric bis-diphenylene ethylene.

A further object is to produce complex and mono-bis-diphenylene ethylene together from fluorene by heat treatment with metallic oxides which contain labile oxygen groupings and the production from fluorene of thermoplastic resins of high softening point which are particularly adapted for use in electrical installations and which can be incorporated in moulding powders with or without the addition of fillers or plasticisers, for the production of moulded articles of high softening point.

This invention consists in the method of producing complex hydrocarbon resins of low molecular weight and high softening point from the monomeric bis-diphenylene ethylene resulting from the dehydrogenation of fluorene characterised by prolonged heat treatment of the dehydrogenation product at about 360° C.

One form of this invention comprises the method of producing monomeric bis-diphenylene ethylene and complex hydrocarbons of low molecular weight and high softening point by heat treatment of fluorene with metallic oxide or oxides containing labile oxygen groupings followed by exhaustive extraction by benzene and precipitation of the complex hydrocarbon mixture by alcohol. Thus the concentrated benzene solution may be poured into alcohol to precipitate the complex which is filtered off while the bis-diphenylene ethylene is crystallised from the filtrate.

Another form of this invention comprises the method in which the bis-diphenylene ethylene is removed by distillation followed by direct solvent extraction of the distillate while complex hydrocarbons in the dehydrogenation product are not distilled and remain in the residue.

This invention further comprises the method of producing from fluorene thermoplastic resins which method consists in producing bis-diphenylene ethylene (monomer or polymer or both) by heat treatment of fluorene with metallic oxide or oxides containing labile oxygen groupings, separating said bis-diphenylene ethylene product and subjecting it to polymerisation by heat (preferably in the presence of a polymerisation catalyst).

It will be appreciated that the production from fluorene of thermoplastic resins may be carried out by a two-stage process:

(a) Dehydrogenation of the aromatic hydrocarbon fluorene, to the olefinic hydrocarbon bis-diphenylene ethylene followed by (b) Polymerisation of the olefinic bis-diphenylene ethylene thus produced.

(a) Our method involves the employment of metallic oxide or oxides which, when decomposed by heat, revert to the metal or a lower oxide thereby releasing oxygen for the dehydrogenation reaction. Examples of such metallic oxides are lead monoxide, lead dioxide, iron oxides, oxides of nickel and cobalt, potassium chlorate, sodium nitrate and sodium peroxide.

We have reason to suppose that the oxidation of fluorene proceeds in stages as follows:

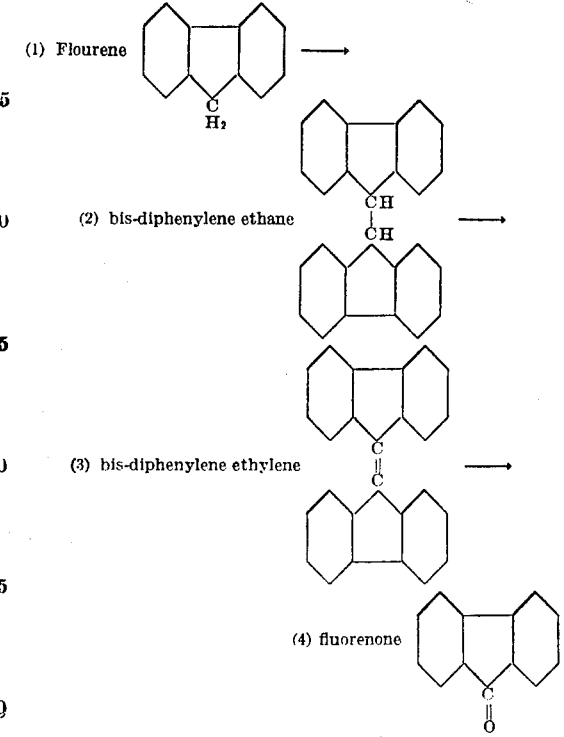

(1) Flourene (2) bis-diphenylene ethane (3) bis-diphenylene ethylene (4) fluorenone It will be appreciated that when the fluorene is subjected to heat treatment with the metallic oxide or oxides so as first to produce bis-diphenylene ethane and thereafter bis-diphenylene ethylene at a temperature in the neighbourhood of 350° C., there is produced not only monomeric bis-diphenylene ethylene but also a complex mixture of hydrocarbons resulting from the polymerisation of the bis-diphenylene ethylene, and we regard it as an important ingredient of this invention that while the said complex is soluble in benzene, it is insoluble in alcohol and the proportion of the complex in the reaction products of the dehydrogenation treatment depends on the time during which said products are maintained at the elevated temperature (about 350 to 360° C.).

The method described below has been carefully worked out to give a maximum yield of bis-diphenylene ethyl with a minimum of contamination by unreacted fluorene, bis-diphenylene ethane, fluorenone and the benzene soluble, alcohol insoluble material.

The fluorene-metallic oxide mixture (1-4 parts approximately by weight) is first heated under efficient reflux at a temperature below the boiling point of fluorene (293° C.) to allow the initial bi-molecular condensation to take place. The mixture is then gradually heated to 350° C. to carry the reaction to the bis-diphenylene ethylene stage. The reaction is promoted when effected under partial vacuum whereby the boiling point of the fluorene is reduced and the water vapour, which is a by-product, is removed from the sphere of reaction. The resultant bis-diphenylene ethylene is removed from the residue either by distillation under subatmospheric pressure or else by exhaustive extraction with benzene.

In the latter case the bis-diphenylene ethylene is isolated either through the formation of the picrate or by pouring the concentrated benzene solution into alcohol (when the complex precipitates), filtering and crystallising the filtrate. Fine, bright red needles, melting point 186 to 187° C. are obtained by this process.

In the distillation process, since the complex is non-distillable, the bis-diphenylene ethylene is obtained directly by solvent extraction of the distillate.

(b) When fused, bis-diphenylene ethylene appears to undergo additive polymerisation, the resultant polymers being sticky or hard purplish-black, translucent resins (the softening point being, of course, dependent on the degree of polymerisation), soluble in hot benzene, sparingly soluble in hot glacial acetic acid, insoluble in cold alcohol. Resins with softening points up to 200° C. can be produced according to the extent to which the polymerisation is taken. By the addition of alcohol the true polymer is thus precipitated from a benzene solution as reddish brown powder, which after solvent fractionation did not melt below 450° C. It was soluble in warm, concentrated sulphuric acid and further oxidisable by air to fluorenone.

Benzoyl peroxide is usually the preferred catalyst for polymerisation. Any suitable amount of catalyst may be used but in general the catalyst concentration will be within the range of 0.1 to 1.0 per cent by weight of the whole. The rate of polymerisation and the properties of the final product vary with the time and temperature and with the catalyst and its concentration. Polymerisation may be effected at various temperatures depending on the catalyst used.

At 360° C. the polymerisation is complete at the end of 18 hours, the transformation being further accelerated by the presence of 1 per cent of benzoyl peroxide.

It is thus clear that by varying the temperature and/or time of oxidation in the initial preparation of bis-diphenylene ethylene, the reaction product can consist of varying amounts of the monomer and polymer respectively. In fact, conditions can be adjusted to yield only the polymer in the reaction product.

*Example 1*

An intimate mixture of 50 g. fluorene, melting point 114° C. and 200 g. lead monoxide was raised to 250° C. in half an hour in a 500 ml. round-bottomed flask fitted with a thermometer, short wide reflux air condenser and mechanical stirrer. The flask was embedded in a sand bath. Sluggish stirring was started as soon as the fluorene began to melt. At the end of this time the temperature was taken to 310° C. over a one-hour period using more vigorous agitation and maintained at this temperature for 1½ hours. The contents were then raised finally to 350° C. in a few minutes by heating the bare flask, very rapid stirring being employed. The flask contents were allowed to cool to room temperature and exhaustively extracted with five volumes of 200 ccs. of benzene under reflux. The benzene extract was filtered free of inorganic material, the blood red liquid concentrated to half bulk and poured into twice its volume of hot alcohol. The precipitated polymeric bis-diphenylene ethylene was then filtered off and the benzene-alcohol solution evaporated to dryness and dissolved in 250 ccs. of benzene. To the boiling solution was added a solution of 70 g. picric acid in 250 ccs. hot benzene. On cooling, the picrate of bis-diphenylene ethylene crystallised out in dark red needles. This was filtered off, dried and bis-diphenylene ethylene released by the action of ammonia solution.

In this way a 96 per cent (48 g.) recovery of organic material, calculated on the weight of fluorene employed, was obtained. Of the 48 g., 6.5 g. (14 per cent) was recovered as the polymer and 30 g. (63 per cent) as the monomer. The remaining organic material was mainly unchanged fluorene (11.5 g.).

*Example 2*

A moulding powder mixture was prepared by incorporating with the alcohol insoluble complex, 70 per cent of fine long fibred asbestos and 20 per cent of dibutylphthalate. The mixture was then moulded in a one-inch laboratory mould at 400° C. with a ram pressure of 1 ton per square inch. The resultant disc was extremely hard and did not soften below 250° C.

Using a 97 per cent polymer –3 per cent monomer mixture in this example but dispensing with the use of the plasticiser, the pressing temperature was reduced to 280° C.

*Example 3*

1 g. of a peroxide catalysed material obtained by heat treatment of the monomer at 360° C. and found to consist of 97 per cent polymer and 3 per cent monomer was dissolved in 30 ccs. of benzene and 6 thicknesses of No. 42 Whatman filter paper soaked in the resultant solution for an hour. The solvent was subsequently evaporated off and the impregnated papers pressed to a hard compounded disc at 200° C. with 2 tons per square inch ram pressure.

We claim:

1. The method of producing thermoplastic resins having melting points of 450° C. and upwards from bis-diphenylene-ethylene which method consists in heating the bis-diphenylene-ethylene with benzoyl peroxide as a catalyst for a prolonged period at a temperature of about 360° C.

2. The method of providing thermoplastic resins as claimed in claim 1 wherein the benzoyl peroxide is present in proportions from 0.1 to 1.0 per cent by weight of the bis-diphenylene-ethylene and the heating period at 360° C. is maintained for about 18 hours.

RAYMOND JOHN STUART JENNINGS.
ALAN FOWLER WILLIAMS.

REFERENCES CITED

The following references are of record in the file of this patent:

UNITED STATES PATENTS

| Number | Name | Date |
| --- | --- | --- |
| 2,194,450 | Scott | Mar. 19, 1940 |
| 2,476,737 | Kern | July 19, 1949 |

OTHER REFERENCES

De la Harpe et al., Ber. 8, 1048–1050 (1875).
Graebe: Ber. 25, 3146–3149 (1892).
Graebe: Annalen, 291, 1–8 (1896).